(12) United States Patent
Chen et al.

(10) Patent No.: US 8,095,489 B2
(45) Date of Patent: Jan. 10, 2012

(54) SYSTEM AND METHOD OF REAL-TIME GROUP INTELLIGENCE CREATION WITH MASS VOLUME OF WEB-BASED THINKING GRIDS

(76) Inventors: Thomas C. H. Chen, Houston, TX (US); Jenny P. Chen, Houston, TX (US)

( * ) Notice: Subject to any disclaimer, the term of this patent is extended or adjusted under 35 U.S.C. 154(b) by 475 days.

(21) Appl. No.: 12/455,709

(22) Filed: Jun. 5, 2009

(65) Prior Publication Data
US 2010/0312729 A1  Dec. 9, 2010

(51) Int. Cl.
*G06F 17/00* (2006.01)
*G06F 7/00* (2006.01)

(52) U.S. Cl. .......................................... 706/45; 707/776
(58) Field of Classification Search ........................ None
See application file for complete search history.

(56) References Cited

U.S. PATENT DOCUMENTS

| | | | |
|---|---|---|---|
| 5,662,478 A | 9/1997 | Smith et al. | |
| 6,018,346 A | 1/2000 | Moran et al. | |
| 6,377,288 B1 | 4/2002 | Moran et al. | |
| 6,509,912 B1 | 1/2003 | Moran et al. | |
| 6,671,693 B1 | 12/2003 | Marpe et al. | |
| 6,901,441 B2 | 5/2005 | Bent et al. | |
| 6,993,723 B1 | 1/2006 | Danielsen et al. | |
| 7,321,883 B1 * | 1/2008 | Freedy et al. | 706/45 |
| 2008/0114715 A1 * | 5/2008 | Palaniappan | 706/60 |
| 2009/0204507 A1 * | 8/2009 | Cockayne et al. | 705/26 |

OTHER PUBLICATIONS

Ken Hudson, The Idea Generator, Allen & Unwin, 2007, Australia.
H. James Harrington, Glen D. Hoffherr, Robert P. Reid, Jr.The Creativity Toolkit, McGraw-Hill, 1998, USA.
Arthur Vangundy, 101 Activities for Teaching Creativity and Problem Solving, Pfeiffer of John Wilsy & Sons, Inc., 2005, USA.

* cited by examiner

Primary Examiner — Alan Chen

(57) ABSTRACT

A Real-Time Group Intelligence Creation System 100 comprising of Group Intelligence Creation Controller 200, Facilitator Expert System 300, Adaptive Group Intelligence Mining Engine 400, Intelligent Web Communicator 500, Idea and Solution Source Data Server 600, and Classification, Extraction, Thinking Pattern and Hint Data Server 700. The System extends traditional computational grid to include idea creations and problem solving generations to form a collaborative thinking grid that is made up of mass volume of participants using either mobile device or stationary device, and is without the need of face-to-face interaction. The System uses both shallow knowledge and deep knowledge mining agents to mine unstructured ideas and solutions in real-time for unifying multiple topics and generating classifications, extractions, thinking patterns and hints. This information are provided to participants during creation processes in order to simulate and accelerate participants' thinking further. The System's group intelligence creation processes is without time limited and eliminates the need of using paper or board medias. The System allows participant to participate simultaneously in multiple topics, and to switch between thinker role and viewer role during creation processes.

13 Claims, 11 Drawing Sheets

SYSTEM AND METHOD OF REAL-TIME GROUP INTELLIGENCE CREATION WITH MASS VOLUME OF WEB-BASED THINKING GRIDS

BACKGROUND

1. Field of Invention

This invention relates in general to collaborative group thinking creations, and in particular to a real-time group intelligence creation system that uses mass volume of Web-based thinking grids to collaborate, mine, unify and assist idea creations and problem solving generations for multiple topics using globally located stationary or mobile devices.

2. Description of Prior Art

Group thinking creation methods, such as brainstorming or brainwriting is well understood in the art, but have many limitations. These methods usually require participants to sit in a confined space, such as meeting room or classroom in order to conduct face-to-face interactions. The size of participants is usually limits to a small number for a given topic under discussion, and simultaneously participation of multiple topics by participants are usually not feasible. Facilitators are typically required to assist and monitor thinking creation processes. The time frame for thinking creation is also limited, since participants usually can only gather for a certain amount of time. Medias to record creation results to be shared with other participants usually are limited to paper (post-it, notepad, card, etc) or board (blackboard, whiteboard, flip chart, etc.). The information recorded on these medias is hard to be consolidated and stored for future reviews. In addition, classifications, extractions, thinking patterns and hints from participant's creations, which can simulate and accelerate creation processes further, are either not available or not feasible. Other limitations of the traditional group thinking creation methods also include: a) it cannot share the creation results with other non-participants during creation processes, b) it cannot unify ideas created and problem solving generated from multiple topics.

The above-mentioned limitations of traditional group thinking creation methods are reflected on many patent inventions. For example, in U.S. Pat. No. 6,901,441 to Graham Bent et al., it describes information sharing system, not intelligence creation, between heterogeneous devices across a network. In another example, the U.S. Pat. No. 6,993,723 to Danielsen et al reveals a system to provide for listing activities in a graphical user interface in a collaborative work tool framework. Another example is the U.S. Pat. No. 5,662,478 to Rolf C. Smith et al that describes a method using a map to conduct face-to-face teaching for a group of people. In another example, the U.S. Pat. No. 6,671,693 to James S. Marpe et al discusses a method for collecting and disseminating data retrieved from multiple users in a plurality of categories. Also, in U.S. Pat. No. 6,018,346, 6,377,288 and 6,509,912 to Thomas P. Moran et al, it discloses a method for supporting meeting objectives for use in a freeform graphics system.

Computational grid is a device that combines hardware and software to provide convenient way for accessing network-based applications. The device could be a mobile device, such as cellphone, PDA, or a stationary device, such as laptop PC, desktop PC. There is a need to extend traditional computational grid to include one's creative idea and problem solving solutions to form a collaborative thinking grid that makes up of mass volume of participants without the need of face-to-face interaction.

Information mining is different from information searching. In information searching, one is typically looking for something that is already known. In information mining, the goal is to discover patterns of unstructured information that have been submitted by participants during thinking creation processes, and no one has yet known. A need also exists to enhance the collaborative group thinking grids with an unstructured information mining engine to mine all ideas or solutions generated by participants. The information mining processes shall be conducted in real-time so that the dynamic effort of simultaneous submissions from multiple participants for multiple related topics can be used to generate thinking classifications, extractions, thinking patterns and hints. By allowing participants to view those thinking classifications, extractions, thinking patterns and hints in real-time, it can simulate and accelerate thinking creation process further.

OBJECTS ADVANTAGES OF THE INVENTION

Person who creates and posts ideas and problem solving solutions is referred as thinkers in this present invention. Person who browses and read ideas and problem solving solutions created by the thinkers is referred as viewer in this present invention.

The present invention recognizes the limitations of traditional group thinking creation methods, and the above-mentioned needs to create a more powerful group intelligence creation method by taking the advantages of mobile device, Internet, wireline and wireless communication capabilities that are commonly available today. Therefore, it is the object of the present invention to provide a system that allows mass volume of thinkers to participate in collaborative group intelligence creation processes. Quantity and quality of idea and solution creations are usually related to the number of people participating in creation processes. This object allows group intelligence to be created from mass volume of people with diversified background and experience in a short period of time.

It is the object of this invention to provide a system that thinkers are not necessary to sit in a confined space in order to participate in collaborative group intelligence creation processes. This object extends traditional face-to-face intelligence creation to thinkers who are never met, and probably global located to engage in creation processes.

It is another object of this invention to provide a system that replaces human facilitators with computer-based concurrent session monitors for collaborative group intelligence creation processes. Human facilitators can usually facilitate only a limit number of people during creation processes. Human facilitator might also be subjective to certain topics, and hence might be facilitating creation process according to personal preference. This object helps to avoid these potential problems.

Another object of this invention is to provide a system that allows the collaborative group intelligence creation processes to be continued for a long period of time. This object allows a topic or a group of related topics to continue intelligence creation processes without a specific ending time. The creation process can be suspended by a computer-based concurrent session monitor at an appropriate time.

It is also the object of this invention to provide a system that allows thinkers to participate, simultaneously, in multiple topics of idea creations and problem solving generations during collaborative group intelligence creation processes. These multiple topics could be related or non-related, depending on the choice of thinkers and viewers.

Another object of this invention is to provide a system that uses both shallow and deep knowledge mining agents to mine unstructured ideas and solutions in order to provide classifications, extractions, thinking patterns and hints of ideas and solutions that have been generated so that it can be viewed by thinkers in real-time. This object will simulate thinker's thinking processes, and accelerate collaborative group intelligence creation processes.

Another object of this invention is to provide a system that eliminates any paper or board medias for storing ideas and solutions generated. This object uses the latest Web technologies as well as database management system to allow thinkers to store and retrieve information during collaborative group intelligence creation processes.

Another object of this invention is to provide a system that allows viewers to view the ideas and solution generated by thinkers, in real-time, during collaborative group intelligence creation processes. This object also allows viewer to switch between viewer role and thinker role, and hence encourage more participations in the creation processes.

Further object of this invention is to provide a system that allows both thinkers and viewers to use either a mobile device, such as cellphone, PDA, or a stationary device, such as laptop PC, desktop PC, to participate. This object allows participants to engage in collaborative group intelligence creation processes from anywhere at anytime.

Further objects and advantages of this invention will become apparent from a consideration of the ensuing descriptions and accompanying drawings below.

BRIEF DESCRIPTION OF THE DRAWINGS

For a further understanding of the objects and advantages of the present invention, references should be made to the following drawings in conjunction with the accompanying descriptions, wherein.

SUMMARY

A Real-Time Group Intelligence Creation System 100 comprising of Group Intelligence Creation Controller 200, Facilitator Expert System 300, Adaptive Group Intelligence Mining Engine 400, Intelligent Web Communicator 500, Idea and Solution Source Data Server 600, and Classification, Extraction, Thinking Pattern and Hint Data Server 700. The Real-Time Group Intelligence Creation System 100 extends traditional computational grid to include idea creations and problem solving generations to form a collaborative thinking grid that is made up of mass volume of participants using either mobile device or stationary device, and is without the need of face-to-face interaction. More specifically, the Group Intelligence Creation Controller 200 uses a concurrent service administrator to administrate and manage idea and solution creation related application services and a concurrent device session administrator to serve concurrent computational requests from either mobile device or stationary device during group intelligence creation processes. The Facilitator Expert System 300 uses facilitator knowledge base together with inference controller to inference and execute necessary tasks and actions during creation processes. Adaptive Group Intelligence Mining Engine 400 uses both shallow knowledge agent and deep knowledge mining agent to mine unstructured ideas and solutions in real-time for unifying multiple topics and generating classifications, extractions, thinking patterns and hints. This information is provided to participants during creation processes in order to simulate and accelerate participants' thinking further. Intelligent Web Communicator 500 uses Mobile Device Web Content Presenter and Mobile Device Group Intelligence Processor to handle multiple requests from mobile device user, and Stationary Device Web Content Presenter and Stationary Device Group Intelligence Processor to handle multiple requests from stationary device user. The group intelligence creation processes of Real-Time Group Intelligence Creation System 100 is without time limited and eliminates the need of using paper or board medias. The System allows participant to participate simultaneously in multiple topics, and to switch between thinker role and viewer role during creation processes.

PREFERRED EMBODIMENT

System Description

Figure 1:
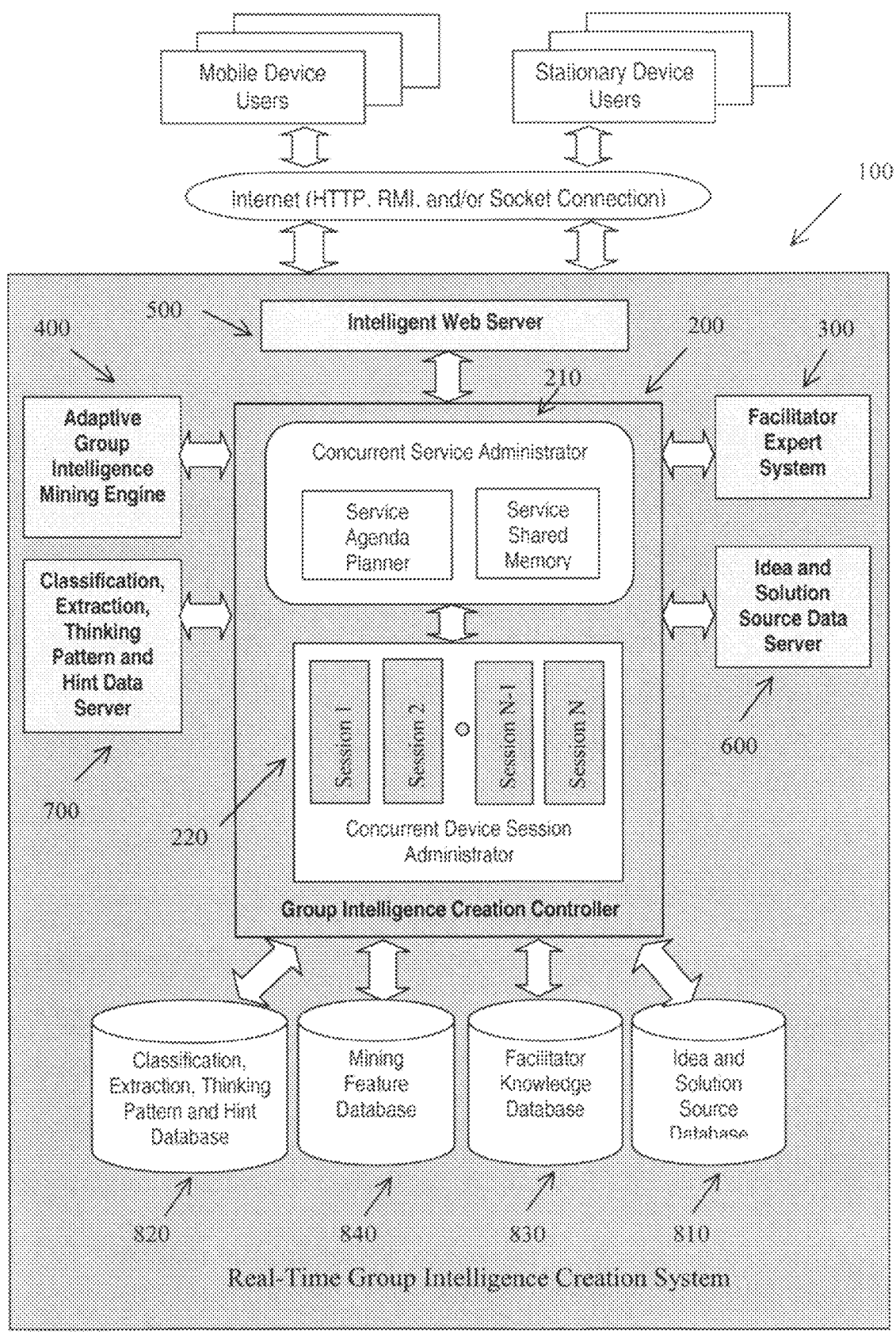
FIG. 1 is an illustrative block diagram of Real-Time Group Intelligence Creation System of this invention. The Real-Time Group Intelligence Creation System consists of six major components: 1) Group Intelligence Creation Controller, 2) Facilitator Expert System, 3) Adaptive Group Intelligence Mining Engine, 4) Intelligent Web Communicator, 5) Idea and Solution Source Data Server, 6) Classification, Extraction, Thinking Pattern and Hint Data Server.
Figure 2:
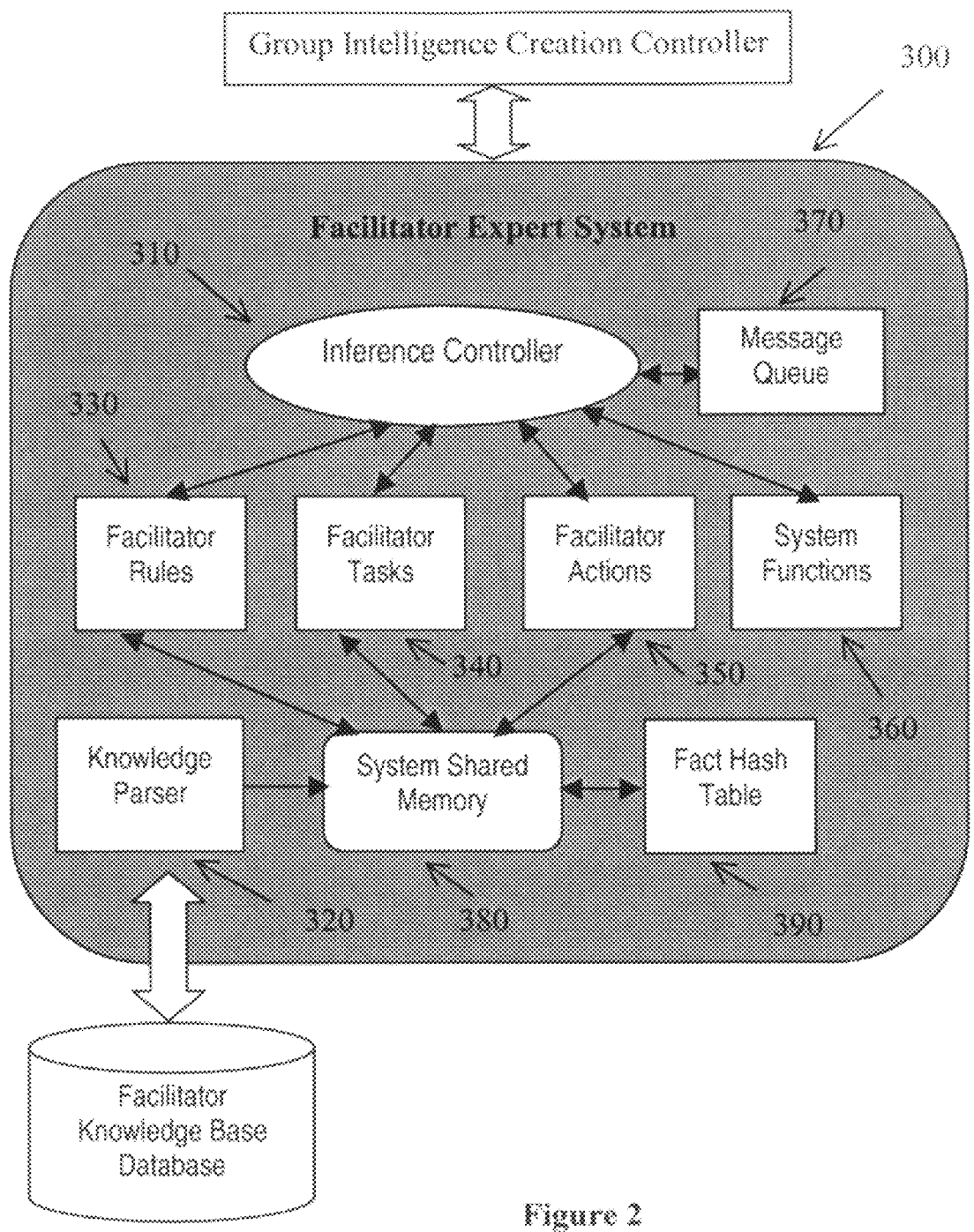
FIG. 2 is an illustrative block diagram of the Facilitator Expert System of this invention. The Facilitator Expert System uses inference controller and facilitator knowledge base to guide and monitor group intelligence creation processes.
Figure 3:
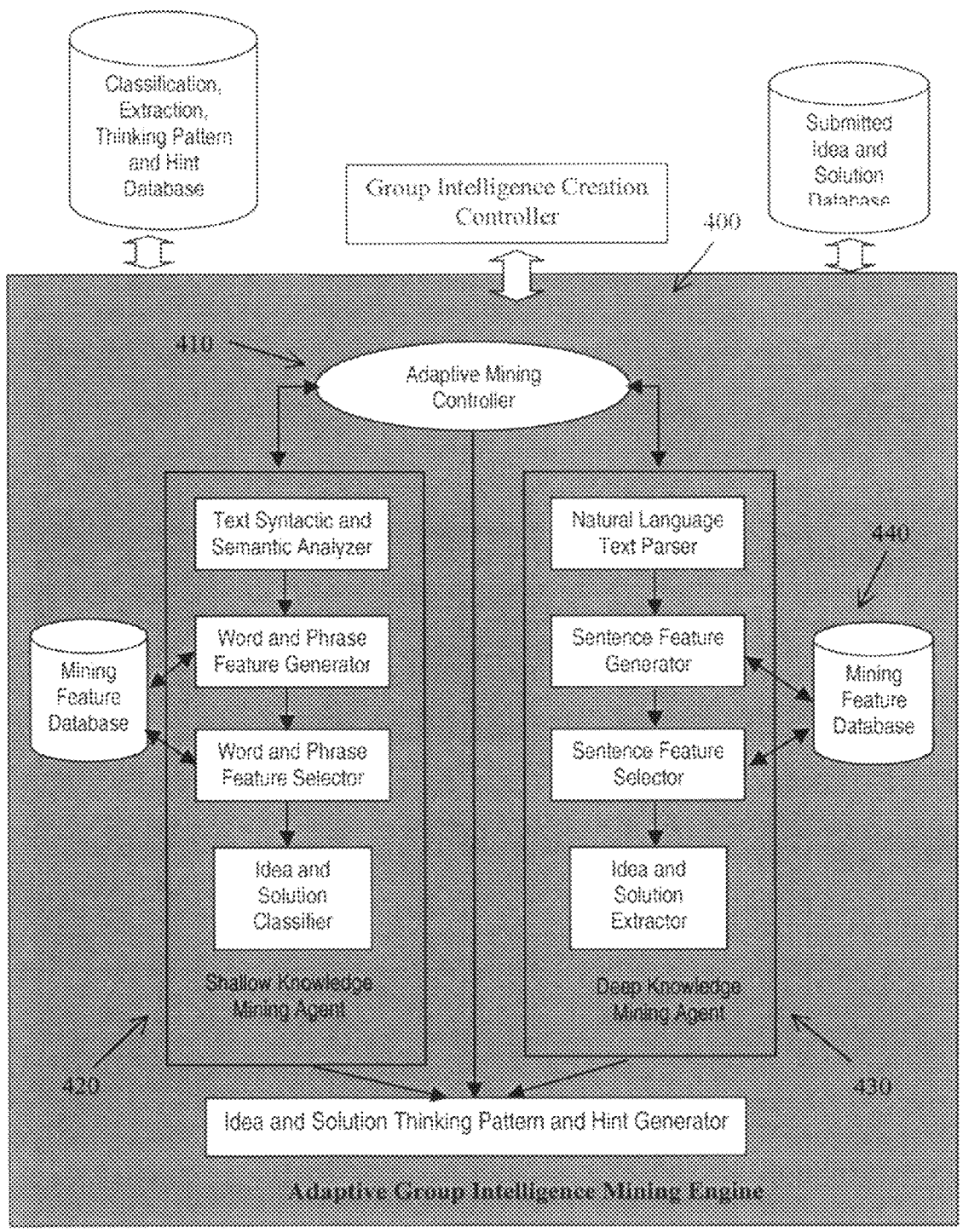
FIG. 3 is an illustrative block diagram of the Adaptive Group Intelligence Mining Engine of this invention. The Adaptive Group Intelligence Mining Engine includes both Shallow Knowledge Mining Agent and Deep Knowledge Mining Agent to generate idea and solution classifications, extractions, thinking patterns and hints in order to stimulate and accelerate group intelligence creation processes.
Figure 4:
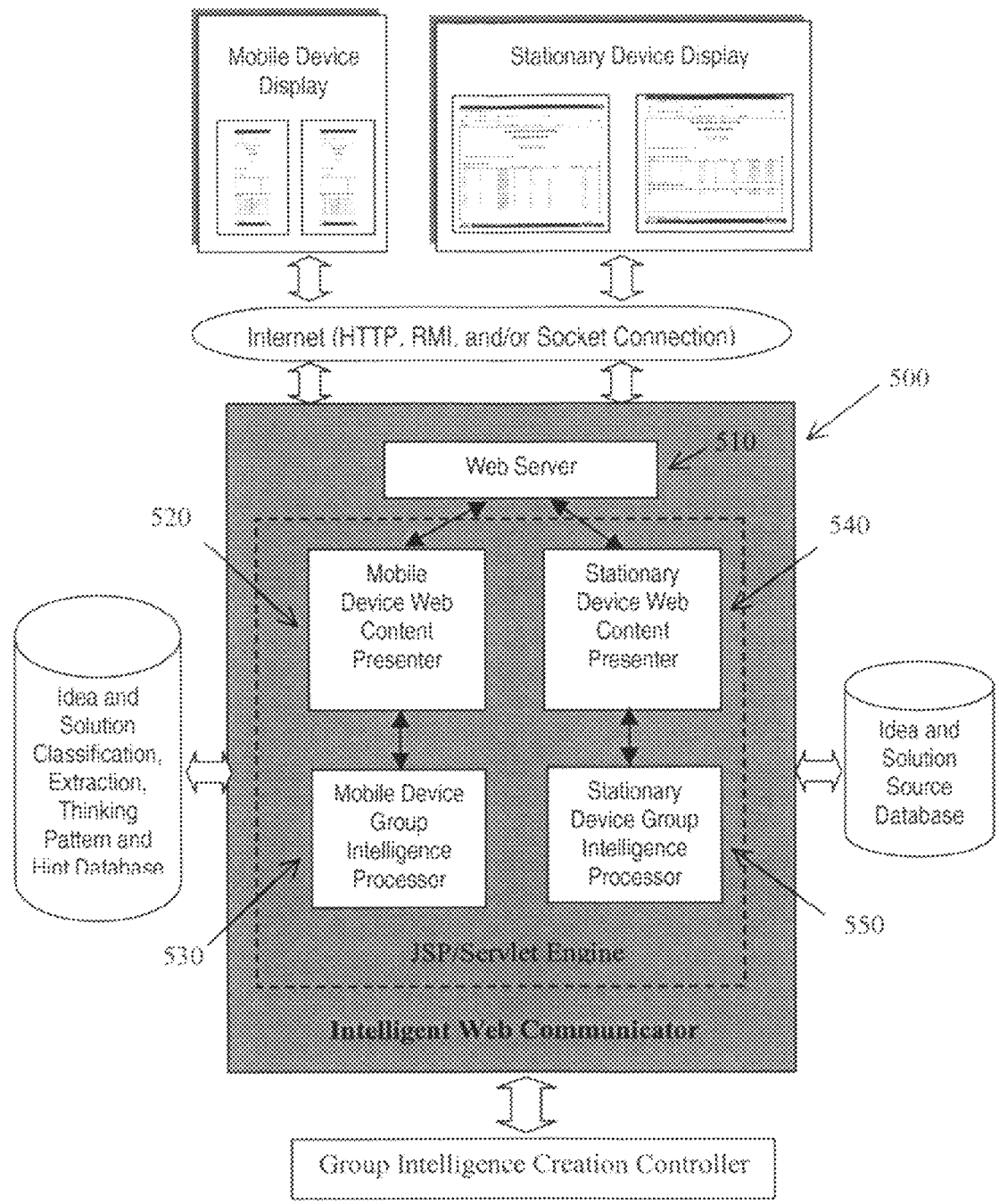
FIG. 4 is an illustrative block diagram of the Intelligent Web Communicator of this invention. The Intelligent Web Communicator, operating under JSP/Servlet engine, acquires idea and solution source information from database, and processes it into proper formats for either mobile device or stationary device to be displayed.
Figure 5:
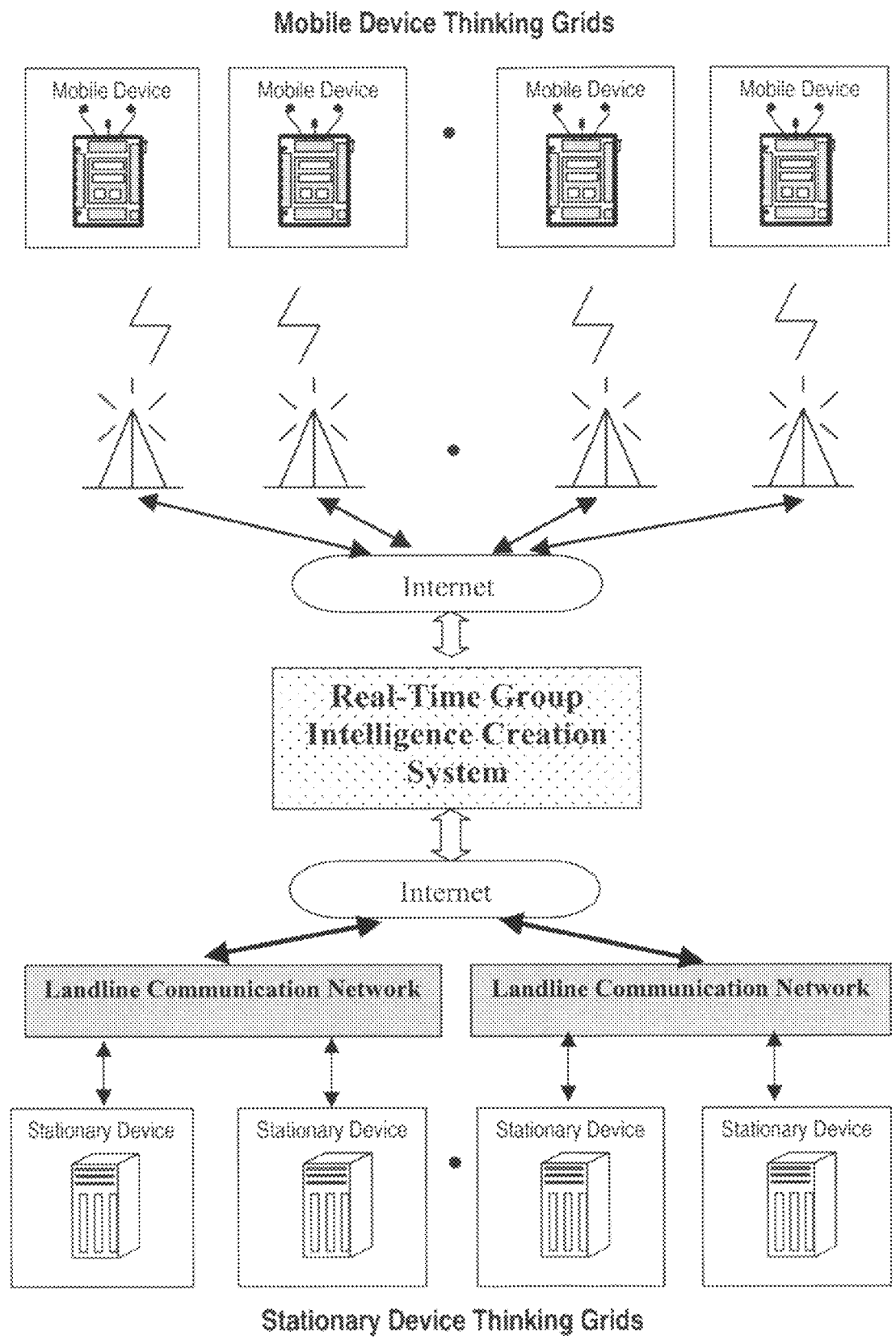
FIG. 5 is an illustrative block diagram of the User View of Thinking Grids of this invention that includes mobile device thinking grids and stationary device thinking grids.

FIG. 1 shows the components of Real-Time Group Intelligence Creation System 100 which consists of Group Intelligence Creation Controller 200, Facilitator Expert System 300, Adaptive Group Intelligence Mining Engine 400, Intelligent Web Communicator 500, Idea and Solution Source Data Server 600, Classification, Extraction, Thinking Pattern and Hint Data Server 700, Idea and Solution Source Database 810, Classification, Extraction, Thinking Pattern and Hint Database 820, Facilitator Knowledge Base Database 830, and Mining Feature Database 840.

Group Intelligence Creation Controller 200, residing in Real-Time Group Intelligence Creation System 100, is used for creating and serving threads to process concurrent computational requests from either mobile device or stationary device during group intelligence creation processes. Group Intelligence Creation Controller 200 is comprised of Concurrent Service Administrator 210 and Concurrent Device Session Administrator 220. Concurrent Service Administrator 210 receives processing requests from Intelligent Web Communicator 500 and is responsible for administrating and managing idea and solution creation related application services. Concurrent Device Session Administrator 220 is connected to Concurrent Service Administrator 210 and is responsible for creating and serving threads to process concurrent computational requests from either mobile device or stationary device during group intelligence creation processes.

Facilitator Expert System 300, residing in Real-Time Group Intelligence Creation System 100, is used to guide and monitor group intelligence creation processes. Facilitator Expert System 300 is comprised of Inference Controller 310, Knowledge Parser 320, Facilitator Rules 330, Facilitator Tasks 340, Facilitator Actions 350, Facilitator Functions 360, System Message Queue 370, System Shared Memory 380, and Fact Hash Table 390. Knowledge base of Facilitator Expert System 300 includes objects of facts, rules, tasks, actions and functions. Facts of this invention are data in object-key-value set (OKVs) form. Facilitator Expert System 300 manages these OKVs by adding, deleting, changing and looking up entries at Fact Hash Table of System Shared Memory to be used for its reasoning processes. Rules are objects that check the validity of fact in Fact Hash Table and take proper action if needed. Rule has a priority that defines which rule object shall check against facts in Fact Hash Table of System Shared Memory first. Based on checking results, Inference Controller 310 decides whether rule should fire or not. Multiple rules can have the same priority. Action objects of this invention represent processes of Group Intelligence Creation Controller 200. Action object contains methods, which perform operation such as accessing and altering facts in Fact Hash Table of System Shared Memory. Action objects are provided with input data as key-value pair in Fact Hash Table, and can return in different forms from the one it receives. Task object invokes a tree of action in the order that is defined in Facilitator Knowledge Base. Task object provides methods for adding actions, inserting actions, or removing actions in/from the tree list. Function object is an executable program component that interacts with firmware or operating system, and provides an interface that can be invoked by Group Intelligence Creation Controller 200. It allows efficient algorithms to be created for improving network and grid computing performance. Inference Controller of Facilitator Expert System 300 serves two reasoning process purposes. First reasoning process of Group Intelligence Creation Controller 200 is to decide where to start, re-run or end a system. Inference Controller 310 of this invention uses two strategies, forward chaining and backward chaining, for reasoning.

Adaptive Group Intelligence Mining Engine 400, residing in Real-Time Group Intelligence Creation System 100, is used to generate idea and solution thinking patterns and hints for assisting group intelligence creation processes. Adaptive Group Intelligence Mining Engine 400 is comprised of Adaptive Mining Control 410, Shallow Knowledge Mining Agent 420, Deep Knowledge Mining Agent 430, and Ming Feature Database 440. Both Shallow Knowledge Mining Agent 420 and Deep Knowledge Mining Agent 430 are unstructured text mining engine, and are used to mine group intelligence from ideas and problem solutions generated.

Intelligent Web Communicator 500, residing in Real-Time Group Intelligence Creation System 100, is used for acquiring idea and solution information from already generated and mined information in database, and processes it into proper formats for mobile device or stationary device to be displayed by using a jsp/servlet engine as concurrent computational service. Intelligent Web Communicator 500 is comprised of Web Server 510, Mobile Device Web Content Presenter 520, Mobile Device Group Intelligent Processor 530, Stationary Device Web Content Presenter 540, and Stationary Device Group Intelligence Processor 550. Intelligent Web Communicator 500 receives processing requests from either mobile device or stationary device through Internet protocols of HTTP, RMI or Socket connection, and processes the request according to device type. If the request is from a mobile device, Mobile Device Web Content Presenter 520 and Mobile Device Group Intelligent Processor 530, both operating under JSP/Servlet engine, are activated to process the request. If the request is from a stationary device, Stationary Device Web Content Presenter 540 and Stationary Device Group Intelligence Processor 550, both also operating under JSP/Servlet engine, are activated to process the request.

Idea and Solution Source Data Server 600 of this invention is used for storing, verisonizing and retrieving ideas and solutions generated. Classification, Extraction, Thinking Pattern and Hint Data Server 700 of this invention is used for storing, verisonizing and retrieving idea and solution classifications, extractions, thinking patterns and hints that are mined by Adaptive Group Intelligence Mining Engine 400.

PREFERRED EMBODIMENT

Method Description

Figure 6:
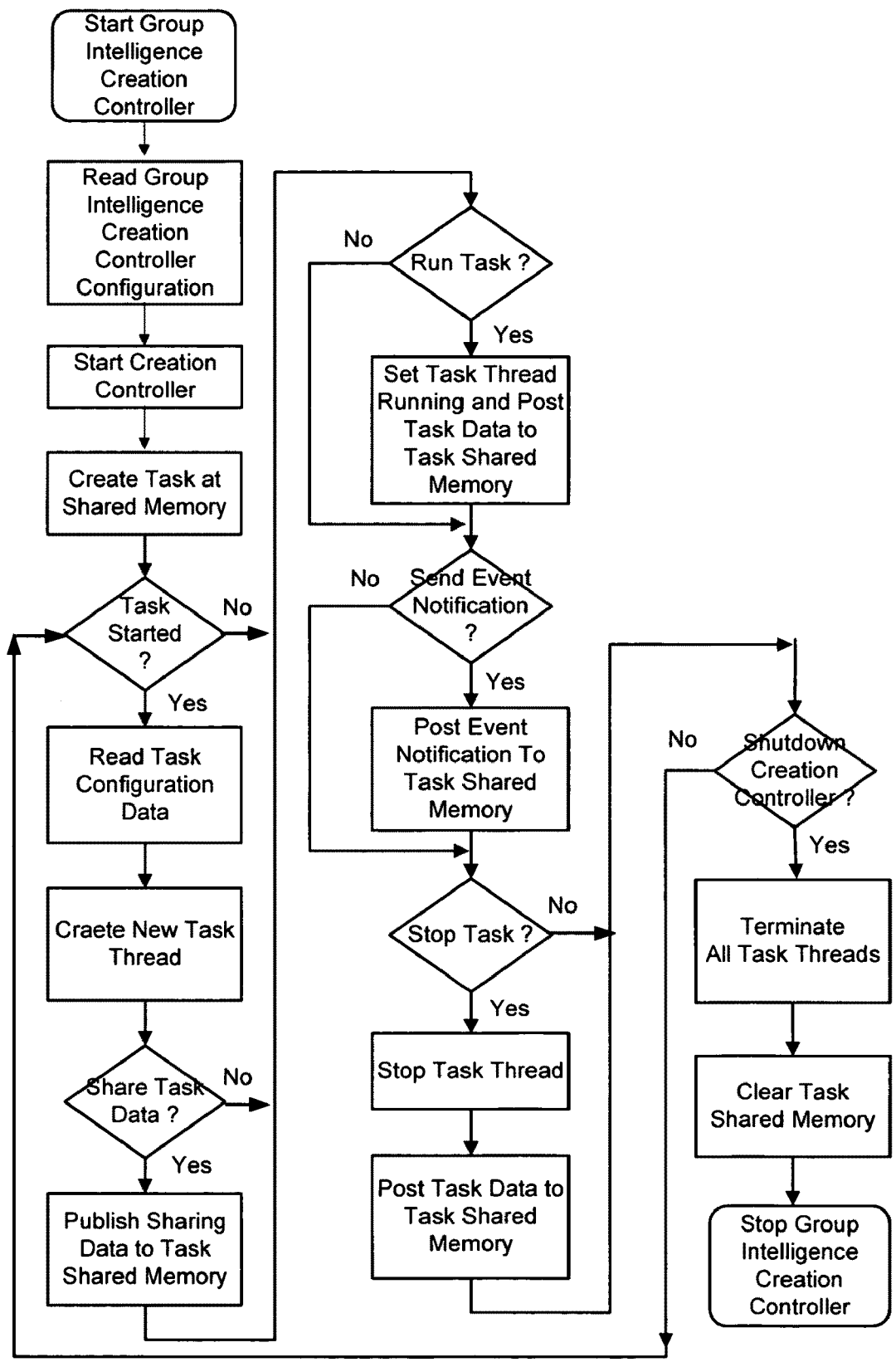
FIG. 6 is an illustrative schematic diagram of the method of Group Intelligence Creation Controller in this invention.

FIG. 6 is an illustrative schematic diagram of the method of Group Intelligence Creation Controller in this invention. The Group Intelligence Creation Controller allows a large group of thinkers to create and collaborate ideas for conceiving new products, services, processes of making things, or how to locate and use of resources around us. It can also be used to generate problem solving solutions when facing specific problem or situation. Through real-times idea and solution mining, the Real-Time Group Intelligence Creation System of this invention provides thinkers with unified classifications, extractions, thinking patterns and hints to guide and help thinking creation processes.

A person can become a thinker in two ways. The first type of thinker can provide a specific topic to be discussed. One can select a topic from system's category list (such as new product, new service, green energy, how to use a computer when it is idle, etc.) to be used as topic, or can come up one's own topic for creation. The second type of thinker can generate ideas or solutions for a particular topic of one's choice. Thinker has three helping options in idea creation or solutions generation processes: 1) seeing the mined information, in real-time, of all ideas or solutions that had been generated so far, 2) selecting a particular idea or solution that has been generated to improve from it, 3) using topic description to create one's new idea or new solution. Due to bandwidth and display size of different computational grid (i.e., mobile device or station device), user interface of idea creation or solution generation processes are formatted differently.

One can become a viewer by selecting a topic from system's category list). Viewer has three helping options in this viewing processes: 1) seeing the mined information, in realtime, of all ideas or solutions that had been generated so far, 2) selecting a particular idea or solution that has been generated to read more about it, 3) switching to thinker role to participate in generating one's new idea or new solution. Due to bandwidth and display size of different computational grid, user interface of idea or solution viewing processes are also formatted differently.

Figure 7:
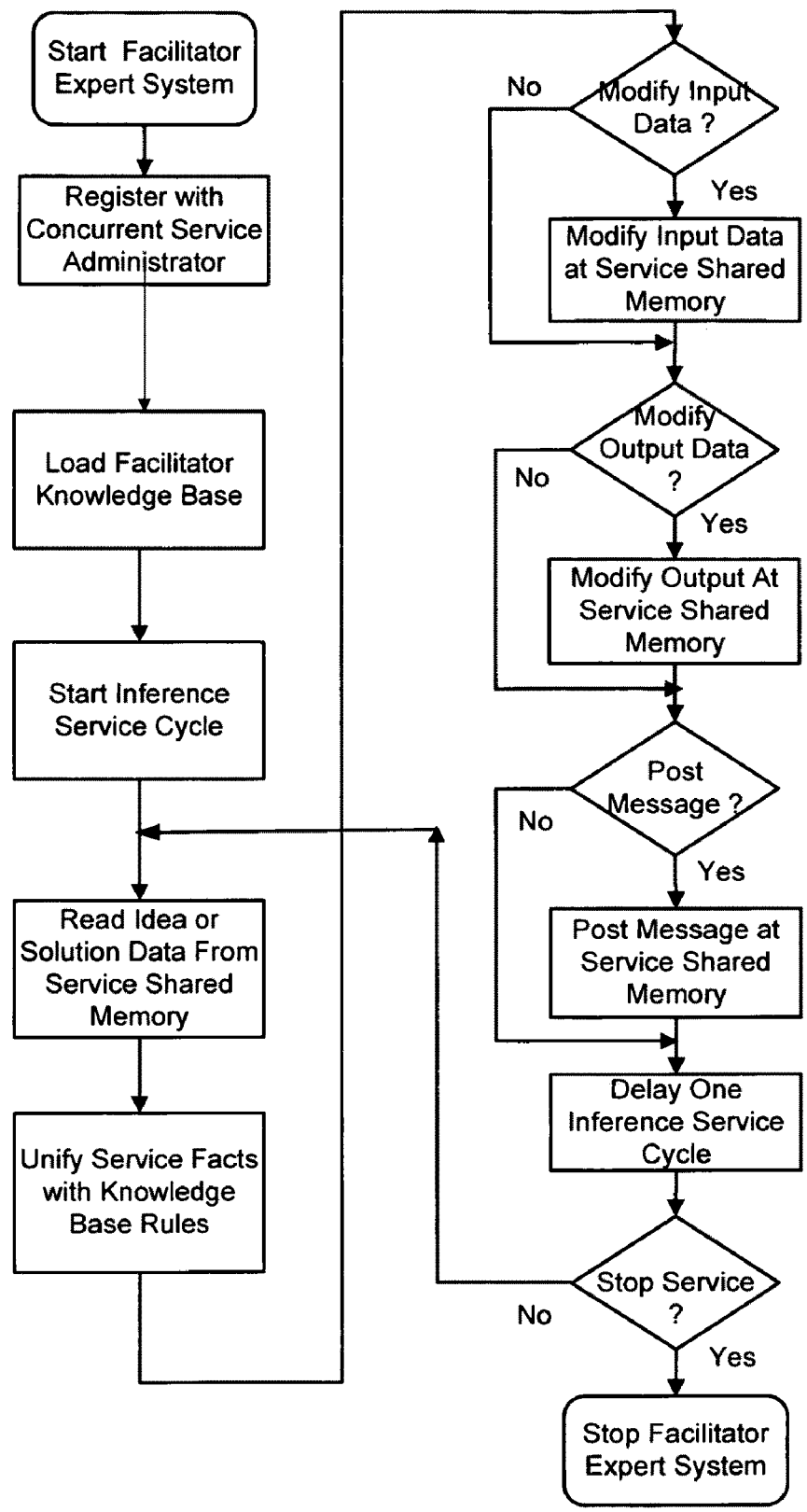
FIG. 7 is an illustrative schematic diagram of the method of Facilitator Expert System in this invention.

FIG. 7 is an illustrative schematic diagram of the method of Facilitator Expert System in this invention. The Facilitator Expert System first registers its facilitator expert system task with concurrent service administrator. It then checks the status of service activation. If the service is activated, facilitator knowledge base is loaded and facilitator expert system task then starts its inference cycle. Facts in Fact Hash Table are unified with the condition part of knowledge base. Modifications of input and/or output data in shared memory are performed if needed. Once the conduction part of knowledge base is satisfied, tasks and actions are executed to post necessary messages and data entries to shared memory. The facilitator expert system task is then delayed one inference service cycle before re-starting again. At the request of concurrent service administrator, the facilitator expert system task stops its operation.

Figure 8:
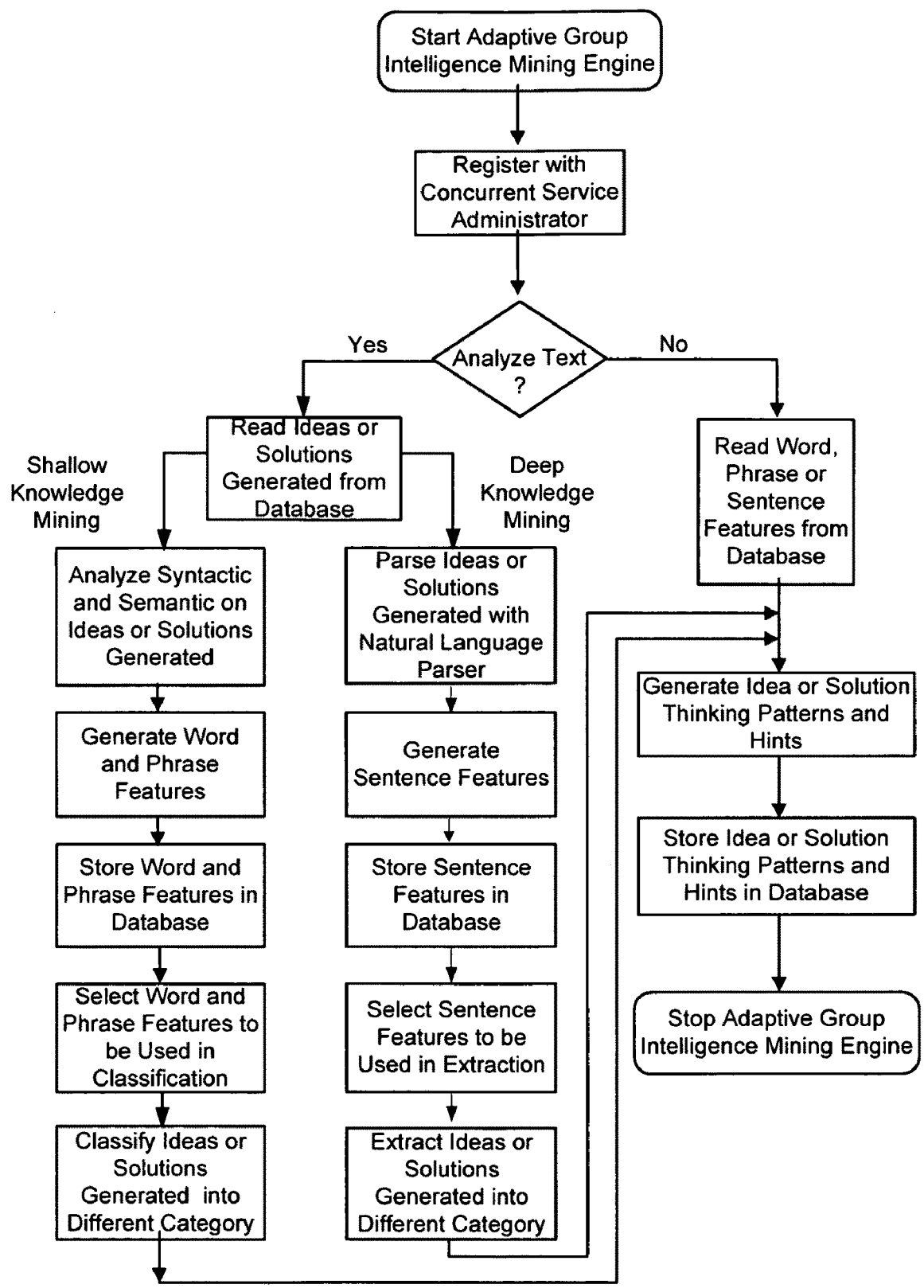
FIG. 8 is an illustrative schematic diagram of the method of Adaptive Group Intelligence Mining Engine in this invention.

FIG. 8 is an illustrative schematic diagram of the method of Adaptive Group Intelligence Mining Engine in this invention. The Adaptive Group Intelligence Mining Engine first registers its adaptive group intelligent engine task with concurrent service administrator. It then checks the status of service activation. If the service is activated, it then determines which mining option to be used. If shallow mining option is selected, it then starts to analyze syntactic and semantic on submitted idea or solution and generate word and phrase features for shallow knowledge mining. The word and phrase features generated are stored in database and later selected to be used in classification. If deep mining option is selected, it then first parses idea or solution using natural language parser and generates sentence features for deep knowledge mining. The sentence features generated is stored in database and later selected to be used in extraction for deep knowledge mining. Once the shallow mining processes or deep mining processes are completed, adaptive group intelligent engine task proceeds to generate idea or solution thinking patterns and hints and store it in database for later use. At the request of concurrent service administrator, the adaptive group intelligent engine task stops its operation.

Figure 9:
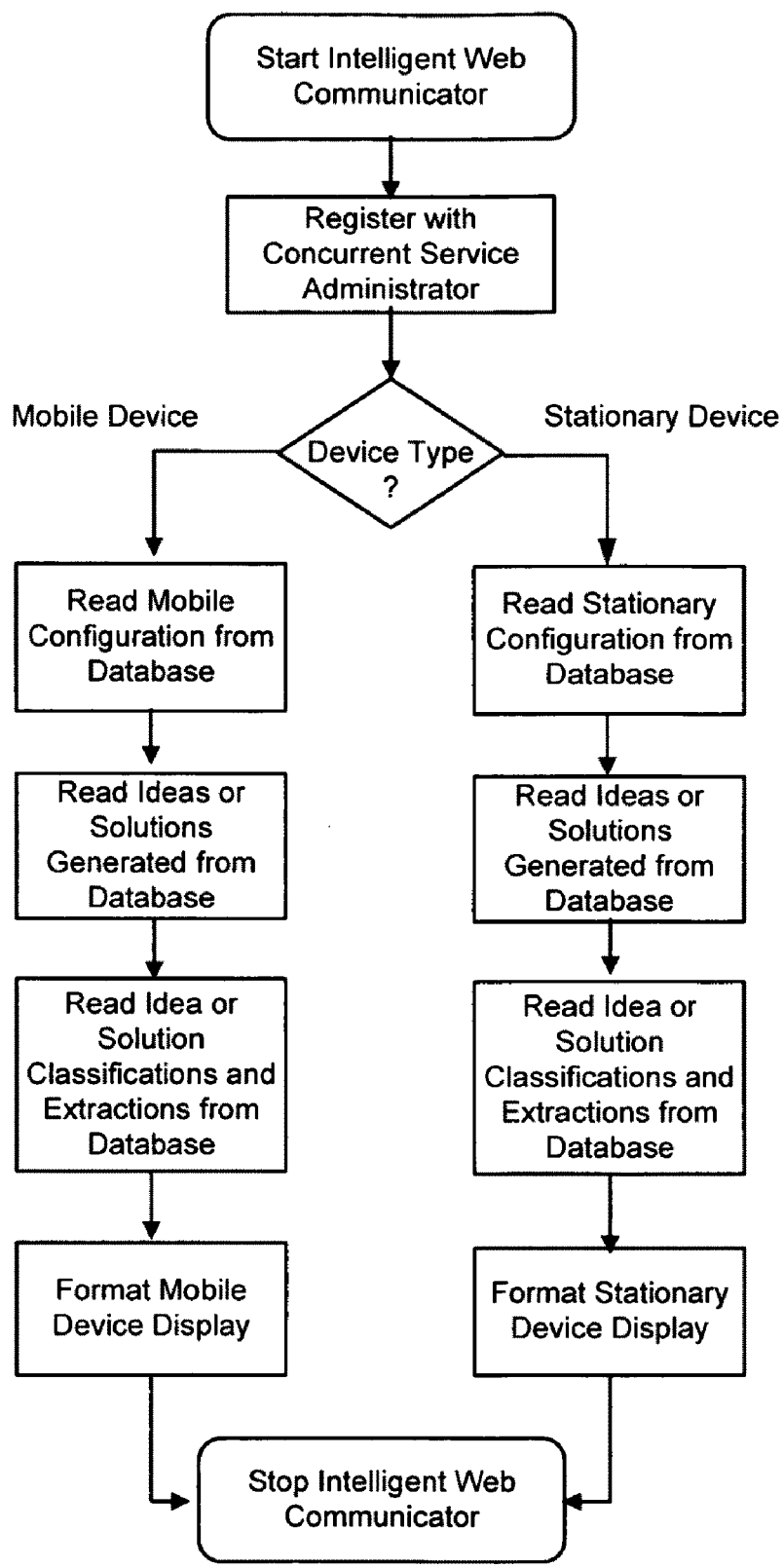
FIG. 9 is an illustrative schematic diagram of the method of Intelligent Web Communicator in this invention.

FIG. 9 is an illustrative schematic diagram of the method of Intelligent Web Communicator in this invention. The Intelligent Web Communicator first registers its intelligent web communicator task with concurrent service administrator. It then checks the status of service activation. If the service is activated, it then determines which type of device is making request. If the request is from a mobile device, it first reads mobile configuration data and then reads idea and solution generated from database. It also reads idea and solution classifications, extractions, thinking patterns and hints from database and formats it into mobile device display to be returned to mobile device request. If the request is from a stationary device, it first reads stationary configuration data and then reads idea and solution generated from database. It also reads idea and solution classifications, extraction, thinking patterns and hints from database and formats it into stationary device display to be returned to stationary device request. At the request of concurrent service administrator, the intelligent web communicator task stops its operation.

Figure 10:
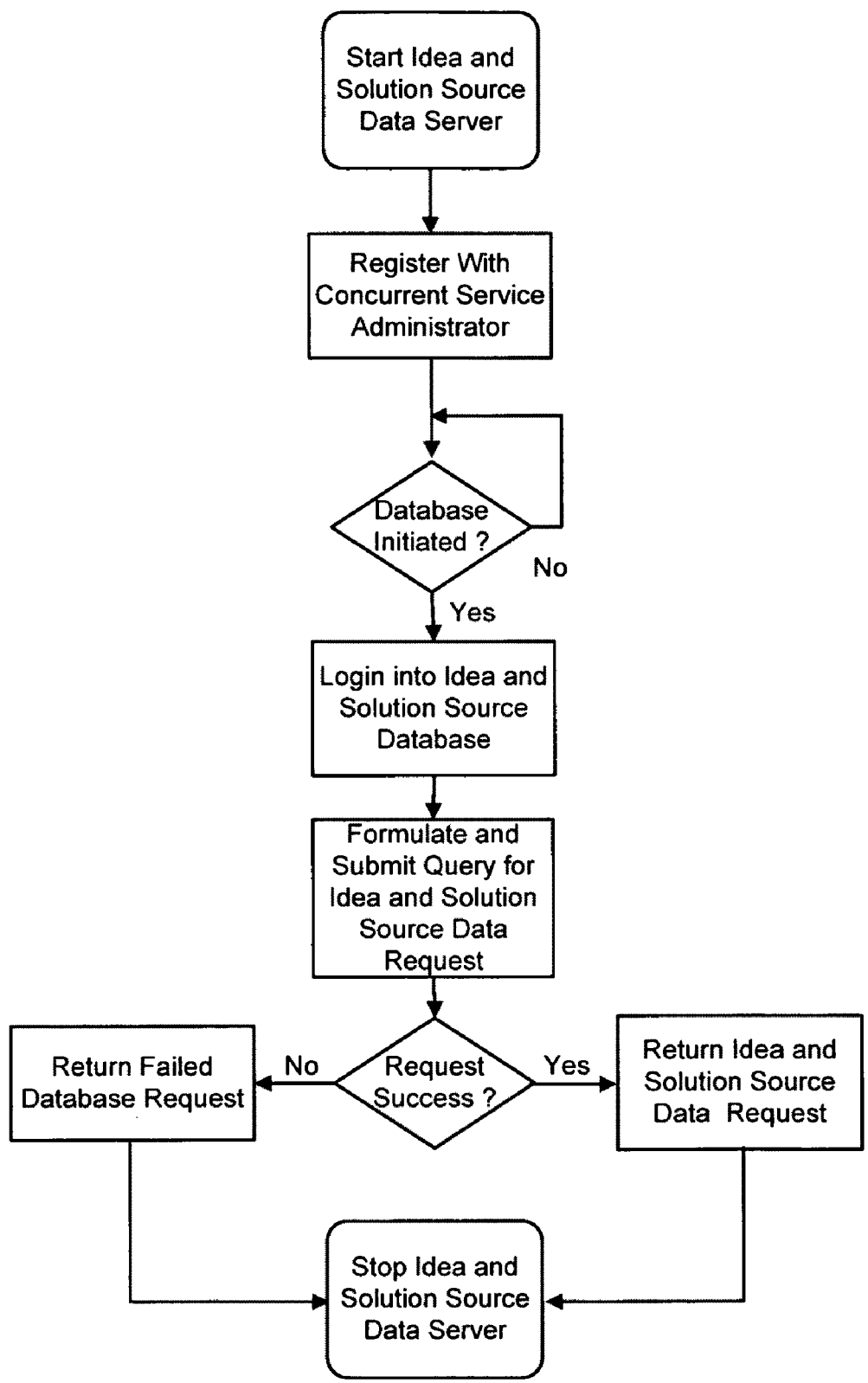
FIG. 10 is an illustrative schematic diagram of the method of Idea and Solution Source Data Server in this invention.

FIG. 10 is an illustrative schematic diagram of the method of Idea and Solution Source Data Server in this invention. The Idea and Solution Source Data Server first registers idea and solution source data server task with concurrent service administrator. It then checks the status of service activation. If the service is activated, it then checks if database is initiated. If the database is initiated, it then login into idea and solution source database. Query for idea and solution data request are then formulated and submitted to database for execution. The results of database query are then returned to the idea and solution source data request. At the request of concurrent service administrator, the idea and solution source data server task stops its operation.

Figure 11:
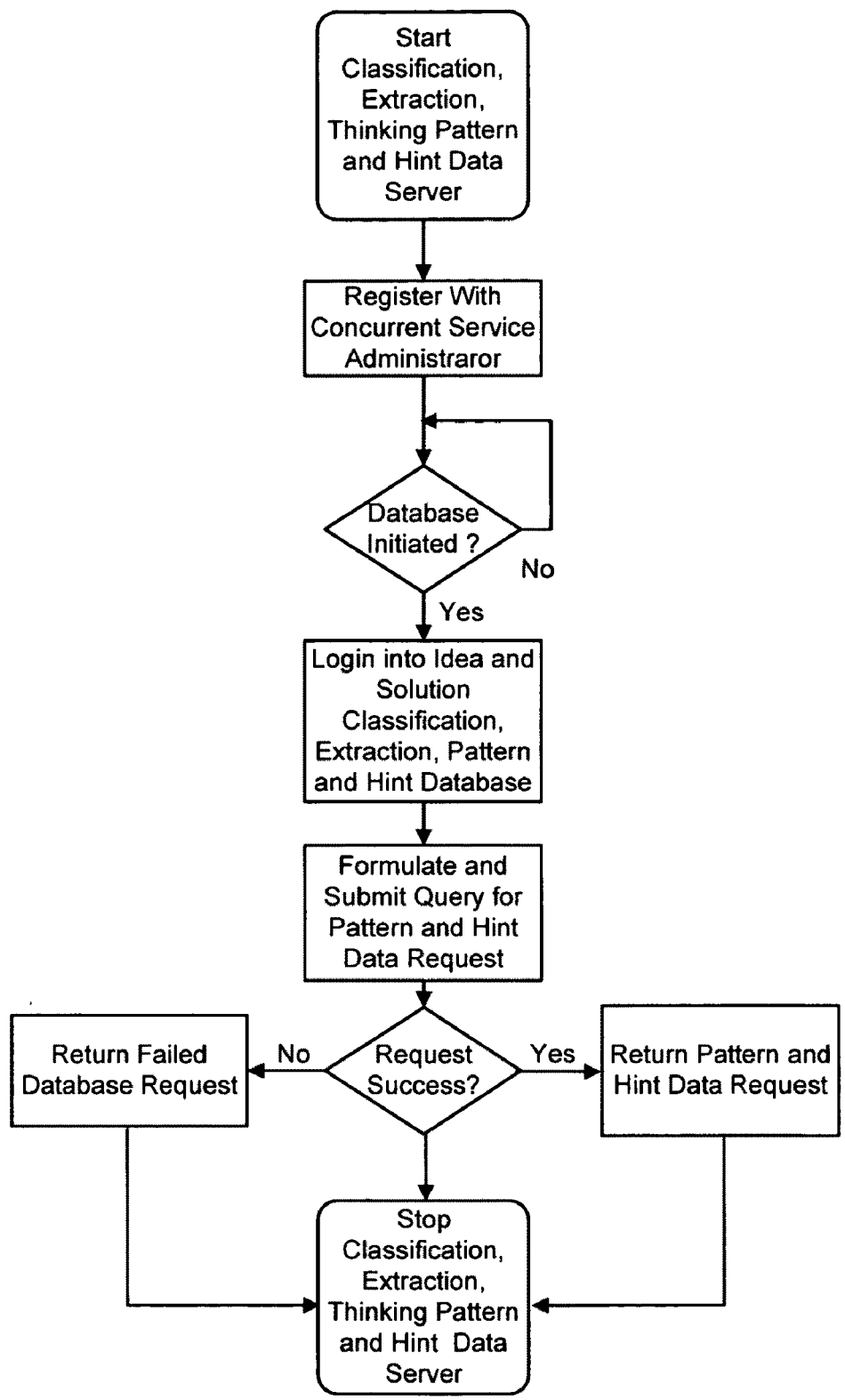
FIG. 11 is an illustrative schematic diagram of the method of Classification, Extraction, Thinking Pattern and Hint Data Server in this invention.

FIG. 11 is an illustrative schematic diagram of the method of Classification, Extraction, Thinking Pattern and Hint Data Server in this invention. The Classification, Extraction, Thinking Pattern and Hint Data Server first registers classification, extraction, thinking pattern and hint data server task with concurrent service administrator. It then checks the status of service activation. If the service is activated, it then checks if database is initiated. If the database is initiated, it then login into classification, extraction, thinking pattern and hint database. Query for classification, extraction, thinking pattern and hint data request are then formulated and submitted to database for execution. The results of database query are then returned to the classification, extraction, thinking pattern and hint data request. At the request of concurrent service administrator, the classification, extraction, pattern and hint data server task stops its operation.

The present invention is further described with reference to the accompanying descriptions and drawings, which show embodiments of the present invention. However, it should be noted that the present invention as disclosed in the accompany drawings is illustrated by way of example only. The various elements and combinations of elements described and illustrated in the drawings can be arranged and organized differently to result in embodiments, which are still within the spirit and scope of the presentation invention.

CONCLUSIONS, RAMIFICATIONS, AND SCOPE

Accordingly, it can be seen that the Real-Time Group Intelligence Creation System in this invention provides an effective way to use mass volume of Web-based computational devices globally located and unstructured information mining methods to create ideas and problem solving generations for multiple topics without time limited and without any paper or board medias and also allowing information during creation processes to be viewed concurrently by person who are not creators of the processes.

Although the description above contains many specificities, these should not be construed as limiting the scope of the invention but as merely providing illustrations for some of the presently preferred embodiments of this invention. Various other embodiments and ramifications are possible within the invention's scope. Thus the scope of this invention should be determined by the appended claims and their legal equivalents, rather than by the examples given.

What is claimed is:

1. A real-time group intelligence creation system comprising of 1) a group intelligence creation controller, and means for using mass volume of web-based computational devices globally located to create ideas or problem solutions for multiple subjects without time limit and without the need of using paper or board medias, allowing participant to participate simultaneously in multiple topics, allowing information to be viewed concurrently by person who are not participating in group intelligence creation processes, and allowing participant to switch between thinker role and viewer role by using a concurrent service administrator and a concurrent device session administrator to serve mass volume of requests, 2) a facilitator expert system, and means for using inference controller and facilitator expert knowledge base to guide and monitor group intelligence creation processes, 3) an adaptive group intelligence mining engine, and means for using two unstructured text mining agents, a) shallow knowledge mining agent, b) deep knowledge mining agent, and adaptive mining controller to determine which agent to be used when mining group intelligence from ideas and solutions submitted by participants in order to generate idea and solution classification, extraction, thinking patterns and hints for assisting group intelligence creation processes, 4) an intelligent web communicator, and means for acquiring idea and solution information from already generated and mined data in database, and processing it into proper formats for mobile device or stationary device to be displayed by using jsp/servlet engine as concurrent computational service, 5) an idea and solution source data server, and means for storing, verisonizing and retrieving ideas and solutions generated, 6) a classification, extraction, thinking pattern and hint data server, and means for storing, verisonizing and retrieving idea and solution classifications, extractions, thinking patterns and hints generated.

2. The group intelligence creation controller as recited in claim 1, comprising of:
   (a) a concurrent service administrator for administrating and managing idea and solution creation related application services,
   (b) a concurrent device session administrator for serving concurrent computational requests from either mobile device or stationary device during group intelligence creation processes.

3. The concurrent service administrator as recited in claim 2, comprising of:
   (a) a service agenda planner for prioritizing and planning services and tasks to be executed at right timing and sequences,
   (b) a plurality of service shared memory for storing and manipulating data entries of said related application during group intelligence creation processes.

4. The facilitator expert system as recited in claim 1, comprising of:
   (a) a knowledge parser to parse facilitator knowledge base loaded from database,
   (b) a plurality of said facilitator rules for representing expert knowledge when conducting facilitating during group intelligence creation processes,
   (c) an inference controller for inferencing said facilitator knowledge base using facts in system shared memory to unify the conduction part of facilitator knowledge base,
   (d) a plurality of facilitator tasks to be executed when the conduction part of facilitator knowledge base is satisfied,
   (e) a fact hash table to hold facts to be unified by said the conduction part of facilitator knowledge base,
   (f) a facilitator message queue to hold incoming messages waiting for execution by inference controller.

5. The adaptive group intelligence mining engine as recited in claim 1, comprising of:
   (a) an adaptive mining controller for administrating and determining if mining agents is needed or what type of knowledge mining agent shall be used,
   (b) a shallow knowledge mining agent for conducting idea and solution classification using ideas and solutions generated,
   (c) a deep knowledge mining agent for conducting idea and solution extraction using ideas and solutions generated.

6. The intelligent web communicator as recited in claim 1, comprising of:
   (a) a web server for communicating with devices using internet communication protocols of http, rmi, or socket connection,
   (b) a mobile device group intelligence processor for creating idea or solution related contents suitable for mobile device,
   (c) a mobile device web content presenter to format contents into a form suitable for displaying in mobile device,
   (d) a stationary device group intelligence processor for creating idea or solution related contents suitable for stationary device,
   (e) a stationary device web content presenter to format contents into to a form suitable for displaying in stationary device.

7. The idea and solution creation related application services as recited of (a) in claim 2, consists of:
   (a) application service to execute facilitator expert system task,
   (b) application service to execute adaptive group intelligent engine task,
   (c) application service to execute intelligent web communicator task,
   (d) application service to execute idea and solution source data server task,
   (e) application service to execute idea and solution classification, extraction, thinking pattern and hint data server task.

8. The group intelligence creation controller as recited in claim 1, comprising of the method steps of:
   (a) reading group intelligence creation controller configuration from system file,
   (b) starting intelligence creation controller,
   (c) creating task in task shared memory,
   (d) checking running status of all tasks,
   (e) reading task configuration of a task if said task needs to be started,
   (f) creating a task thread for said task,
   (g) publishing data sharing option to said task shared memory of said task,
   (h) setting said task running,
   (i) updating data entry at said task shared memory of said task,
   (l) stopping said group intelligence creation controller at the request of said concurrent service administrator,
   (k) terminating all related application tasks, and clearing said task shared memory at the shutdown request of said concurrent service administrator.

9. The facilitator expert system task as recited in (a) of claim 7, comprising the method steps of:
   (a) registering said facilitator expert system task with concurrent service administrator,
   (b) checking service activation,
   (c) loading facilitator knowledge base,
   (d) starting inference cycle,
   (e) unifying facts in the condition part of knowledge base,
   (f) modifying input data at service shared memory,
   (g) modifying output at service shared memory,
   (h) posting message at service shared memory, (i) updating data entry at said task shared memory of said task,
(l) delay one inference service cycle,
(k) stopping said facilitator expert system task at the request of said concurrent service administrator.

10. The adaptive group intelligent engine task as recited in (b) of claim 7, comprising the method steps of:
   (a) registering said adaptive group intelligent engine task with concurrent service administrator,
   (b) determining mining option,
   (c) analyzing syntactic and semantic on ideas or solutions generated for shallow knowledge mining,
   (d) generating word and phrase features for shallow knowledge mining,
   (e) storing word and phrase features in database for shallow knowledge mining,
   (f) selecting word and phrase features to be used in classification for shallow knowledge mining,
   (g) parsing ideas or solutions generated with natural language parser for deep knowledge mining,
   (h) generating sentence features for deep knowledge mining,
   (i) storing sentence features in database for deep knowledge mining,
   (j) selecting sentence features to be used in extraction for deep knowledge mining,
   (k) generating idea or solution thinking patterns and hints,
   (l) storing said idea and solution thinking patterns and hints in database,
   (m) stopping said adaptive group intelligent engine task at the request of said concurrent service administrator.

11. The intelligent web communicator task as recited in (c) of claim 7, comprising the method steps of:
   (a) registering said intelligent web communicator task with concurrent service administrator,
   (b) determining device request type,
   (c) reading mobile configuration from database for mobile device request,
   (d) reading ideas and solutions generated from database for mobile device request,
   (e) reading idea and solution classifications, extractions, thinking patterns and hints from database for mobile request,
   (f) formatting mobile device display for mobile device request,
   (g) reading stationary configuration from database for stationary device request,
   (h) reading ideas and solutions generated from database for stationary device request,
   (i) reading idea and solution classifications, extraction, thinking patterns and hints from database for stationary device request,
   (j) formatting stationary device display for stationary device request,
   (k) stopping said intelligent web communicator task at the request of said concurrent service administrator.

12. The idea and solution source data server task as recited in (d) of claim 7, comprising the method steps of:
   (a) registering said idea and solution source data server task with concurrent service administrator,
   (b) checking database initiation,
   (c) logining into idea and solution source database,
   (d) formulating and submitting query for idea and solution data request,
   (e) returned said idea and solution source data request,
   (f) stopping said idea and solution source data server task at the request of said concurrent service administrator.

13. The classification, extraction, thinking pattern and hint data server task as recited in (e) of claim 7, comprising the method steps of:
   (a) registering said idea and solution classification, extraction, thinking pattern and hint data server task with concurrent service administrator,
   (b) checking database initiation,
   (c) logining into idea and solution classification, extraction, thinking pattern and hint database,
   (d) formulating and submitting query for idea and solution classification, extraction, thinking pattern and hint data request,
   (e) returned said idea and solution classification, extraction, thinking pattern and hint data request,
   (f) stopping said idea and solution classification, extraction, thinking pattern and hint data server task at the request of said concurrent service administrator.

* * * * *